US011390285B2

(12) United States Patent
Adam et al.

(10) Patent No.: US 11,390,285 B2
(45) Date of Patent: Jul. 19, 2022

(54) AUTOMATED LANE CHANGE SYSTEM WITH STEERING WHEEL ACTIVATION FOR A MOTOR VEHICLE

(71) Applicant: GM Global Technology Operations LLC, Detroit, MI (US)

(72) Inventors: Paul A Adam, Milford, MI (US); Gabriel T Choi, Novi, MI (US); Daryl A Wilson, Brighton, MI (US); Tetyana V Mamchuk, Walled Lake, MI (US); Reza Zarringhalam, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 17/038,595

(22) Filed: Sep. 30, 2020

(65) Prior Publication Data
US 2022/0097709 A1    Mar. 31, 2022

(51) Int. Cl.
*B60W 30/18*       (2012.01)
*B60W 10/18*       (2012.01)
(Continued)

(52) U.S. Cl.
CPC ......... *B60W 30/18163* (2013.01); *B60Q 9/00* (2013.01); *B60W 10/04* (2013.01); *B60W 10/18* (2013.01); *B60W 10/20* (2013.01); *B60W 50/16* (2013.01); *B60W 60/0051* (2020.02); *B60W 2050/146* (2013.01); *B60W 2420/42* (2013.01); *B60W 2420/52* (2013.01);
(Continued)

(58) Field of Classification Search
CPC ........... B60W 30/18163; B60W 10/04; B60W 10/18; B60W 10/20; B60W 50/16; B60W 60/0051; B60W 2050/146; B60W 2420/42; B60W 2420/52; B60W 2420/54; B60W 2510/20; B60W 2540/20; B60W 2552/00; B60W 2554/4041; B60W 2554/802; B60W 2555/00; B60Q 9/00
See application file for complete search history.

(56) References Cited

U.S. PATENT DOCUMENTS

7,019,623 B2 *   3/2006   Klausner ................... B62D 1/06
                                                       340/545.4
7,468,656 B1 *  12/2008   Frank ....................... B60Q 1/52
                                                       340/471
(Continued)

*Primary Examiner* — Babar Sarwar
(74) *Attorney, Agent, or Firm* — Vivacqua Crane, PLLC (57) ABSTRACT

An automated lane change system for a motor vehicle includes one or more environmental sensors for generating an input signal indicative of a position of an object relative to the motor vehicle, with the object being disposed at a distance from the motor vehicle. The input signal is further indicative of a velocity of the object relative to the motor vehicle. The system further includes a steering wheel sensor generating a gripped signal, in response to a driver gripping a steering wheel. A controller generates an activation signal, in response to the controller receiving the input signal from the environmental sensor and the gripped signal from the steering wheel sensor. An actuator controls the steering wheel, a propulsion mechanism, and a braking mechanism for maneuvering the motor vehicle from a current driving lane to a target driving lane, in response to the actuator receiving the activation signal from the controller.

20 Claims, 2 Drawing Sheets

(51) Int. Cl.
  *B60W 10/20* (2006.01)
  *B60W 50/16* (2020.01)
  *B60Q 9/00* (2006.01)
  *B60W 60/00* (2020.01)
  *B60W 10/04* (2006.01)
  *B60W 50/14* (2020.01)

(52) U.S. Cl.
  CPC ..... *B60W 2420/54* (2013.01); *B60W 2510/20* (2013.01); *B60W 2540/20* (2013.01); *B60W 2552/00* (2020.02); *B60W 2554/4041* (2020.02); *B60W 2554/802* (2020.02); *B60W 2555/00* (2020.02)

(56) References Cited

U.S. PATENT DOCUMENTS

| | | | |
|---|---|---|---|
| 7,649,278 B2 * | 1/2010 | Yoshida | B60Q 1/1484 307/9.1 |
| 7,841,673 B2 * | 11/2010 | Szczerba | B60T 7/16 303/3 |
| 8,170,725 B2 | 5/2012 | Chin et al. | |
| 8,170,739 B2 | 5/2012 | Lee | |
| 9,896,070 B2 * | 2/2018 | Rosenbaum | B62D 1/06 |
| 10,752,242 B2 * | 8/2020 | Mamchuk | B60W 10/04 |
| 10,768,619 B1 * | 9/2020 | Szybalski | B60W 10/04 |
| 11,148,683 B2 * | 10/2021 | Kaji | B62D 1/04 |
| 2005/0067889 A1 * | 3/2005 | Chernoff | B60L 7/18 303/119.2 |
| 2012/0232751 A1 * | 9/2012 | Guspan | B60K 37/06 701/1 |
| 2012/0318097 A1 * | 12/2012 | Ricci | B62D 1/046 74/553 |
| 2014/0022070 A1 * | 1/2014 | Golomb | B60Q 1/0082 340/475 |
| 2014/0224600 A1 * | 8/2014 | Rosenbaum | B60T 7/085 188/158 |
| 2016/0137217 A1 * | 5/2016 | Golomb | B62D 1/046 74/471 R |
| 2017/0073000 A1 * | 3/2017 | Numazaki | B62D 1/04 |
| 2017/0334453 A1 * | 11/2017 | Mimura | B60W 10/20 |
| 2018/0170326 A1 * | 6/2018 | Wang | B60T 8/1755 |
| 2020/0079368 A1 * | 3/2020 | Yamada | G05D 1/0055 |
| 2020/0156626 A1 | 5/2020 | Mamchuk et al. | |
| 2021/0269025 A1 * | 9/2021 | Zarringhalam | B60W 30/12 |

* cited by examiner

FIG. 1

AUTOMATED LANE CHANGE SYSTEM WITH STEERING WHEEL ACTIVATION FOR A MOTOR VEHICLE

INTRODUCTION

The present disclosure generally relates to automated lane change systems for motor vehicles, and more particularly relates to an automated lane change system being activated, at least in response to a driver gripping a steering wheel.

Automotive manufacturers continuously investigate automated driver-assistance systems that require less driver intervention. Motor vehicle automation has been categorized into numerical levels ranging from level zero where the motor vehicle has no automation with full human control to level five where the motor vehicle has full automation with no human control. Certain systems, such as cruise control, adaptive cruise control, and parking assistance systems, correspond to lower automation levels, while true "driverless" motor vehicles correspond to higher automation levels. The systems may not be activated by the driver taking a position where the driver is able to quickly override the systems to manually operate the vehicle.

While existing automated driver-assistance systems achieve their intended purpose, there is a need for a new and improved automated lane change system that addresses these issues.

SUMMARY

According to several aspects of the present disclosure, an automated lane change system is provided for a motor vehicle with a steering wheel adapted to be gripped by a driver. The system includes one or more environmental sensors adapted to be mounted to the motor vehicle. The environmental sensors generate an input signal indicative of at least one of: a position of an object relative to the motor vehicle, with the object being disposed at a distance from the motor vehicle; a velocity of the object relative to the motor vehicle; and a road geometry including at least a radius of curvature. The system further includes a steering wheel sensor adapted to be mounted to the motor vehicle. The steering wheel sensor generates a gripped signal, in response to the driver gripping the steering wheel. The system further includes a controller communicating with the environmental sensor and the steering wheel sensor. The controller generates an activation signal, in response to the controller receiving the input signal from the environmental sensor and the gripped signal from the steering wheel sensor. The system further includes one or more actuators communicating with the controller and coupled to at least one of the steering wheel, a propulsion mechanism, and a braking mechanism of the motor vehicle. The actuator controls at least one of the steering wheel, the propulsion mechanism, and the braking mechanism for maneuvering the motor vehicle from a current driving lane to a target driving lane that is positioned adjacent to the current driving lane, at least in response to the actuator receiving the activation signal from the controller.

In one aspect, the actuator is configured to be overridden by the driver manually operating at least one of the steering wheel, the propulsion mechanism, and the braking mechanism.

In another aspect, the system further includes a user interface communicating with the controller. The user interface generates a lane change request signal, in response to the user interface receiving an associated command from the driver. The controller generates the activation signal, in further response to the controller receiving the lane change request signal from the user interface.

In another aspect, the user interface is a turning signal stalk mounted to a steering column, a switch mounted to the steering wheel, a touch screen display, or a microphone communicating with the controller and positioned within the motor vehicle.

In another aspect, the steering wheel sensor is a capacitance sensor attached to the steering wheel, a resistive sensor attached to the steering wheel, an electrostatic sensor attached to the steering wheel, or a camera. The environmental sensor is a camera, a lidar, a short range radar, a long range radar, or an ultrasonic sensor.

In another aspect, the controller can be configured to generate the activation signal, in further response to the controller comparing the velocity of the object to a velocity threshold and determining that the velocity is below the velocity threshold. The controller can be configured to generate the activation signal, in further response to the controller comparing the distance between the motor vehicle and the object to a distance threshold and determining that the distance is above the distance threshold. The controller can be configured to generate the activation signal, in further response to the controller calculating a lateral acceleration based on at least the radius of curvature, comparing the lateral acceleration to a lateral acceleration threshold, and determining that the lateral acceleration is below the lateral acceleration threshold.

According to several aspects of the present disclosure, a motor vehicle includes a steering wheel adapted to be gripped by a driver, with the steering wheel controlling a direction of the motor vehicle. The motor vehicle further includes a propulsion mechanism operated by the driver for propelling the motor vehicle. The motor vehicle further includes a braking mechanism for decreasing a speed of the motor vehicle. The motor vehicle further includes an automated lane change system having a user interface positioned within the motor vehicle. The user interface generates a lane change request signal, in response to the user interface receiving an associated command from the driver. The system further includes one or more environmental sensors mounted to the motor vehicle. The environmental sensors generate an input signal indicative of at least one of: a position of an object relative to the motor vehicle, with the object being disposed at a distance from the motor vehicle; a velocity of the object relative to the motor vehicle; and a road geometry including at least a radius of curvature. The system further includes a steering wheel sensor mounted to the motor vehicle. The steering wheel sensor generates a gripped signal, in response to the driver gripping the steering wheel. The system further includes a controller communicating with the environmental sensors and the steering wheel sensor. The controller generates an activation signal, in response to the controller receiving the input signal from the environmental sensor and the gripped signal from the steering wheel sensor. The system further includes one or more actuators communicating with the controller and coupled to the steering wheel, the propulsion mechanism, and the braking mechanism. The actuator controls at least one of the steering wheel, the propulsion mechanism, and the braking mechanism for maneuvering the motor vehicle from a current driving lane to a target driving lane that is positioned adjacent to the current driving lane, at least in response to the actuator receiving the activation signal from the controller. The system further includes a notification device for indicating to the driver that the actuator is maneuvering the motor vehicle from the current driving lane to the target driving lane, in response to the notification device receiving the activation signal from the controller.

In one aspect, the controller generates an instruction signal, in response to the controller receiving the lane change request signal from the user interface and the controller not receiving the gripped signal from the steering wheel sensor. The notification device instructs the driver to grip the steering wheel, in response to the notification device receiving the instruction signal from the controller.

In another aspect, the notification device can be a display screen configured to display text or a symbol associated with the instruction to grip the steering wheel, in response to the display screen receiving the instruction signal from the controller. The notification device can be an indicator lamp mounted to the steering wheel or an instrument cluster of the motor vehicle. The notification device is configured to emit a predetermined color associated with the instruction, in response to the indicator lamp receiving the instruction signal from the controller. The notification device can be a speaker configured to emit an audible instruction, in response to the speaker receiving the instruction signal from the controller. The notification device can be a vibration device mounted to a motor vehicle seat positioned within the motor vehicle. The vibration device can be configured to vibrate, in response to the vibration device receiving the instruction signal from the controller.

In another aspect, the actuator is configured to be overridden by the driver manually operating the steering wheel.

In another aspect, the distance threshold is a predetermined empirical value in a reference lookup table based on at least the velocity of the object relative to the motor vehicle and the length of only the motor vehicle, when the motor vehicle is not towing a trailer.

In another aspect, the user interface or the environmental sensors are configured to input the length of a trailer being towed by the motor vehicle. The controller determines that an updated distance threshold is a predetermined empirical value in the reference lookup table based on the velocity of the object relative to the motor vehicle and the combined length of the motor vehicle and the trailer.

In another aspect, the environmental sensor generates a location signal indicative of the motor vehicle positioned in the target driving lane. The controller generates a termination signal, in response to the controller receiving the location signal from the environmental sensor. The notification device indicates that the system is deactivated, in response to the notification device receiving the termination signal from the controller.

In another aspect, the controller initiates a timer, in response to the controller receiving the lane change request signal from the user interface. The controller generates the termination signal, in further response to the controller not receiving the gripped signal from the steering wheel sensor within a predetermined amount of time.

According to several aspects of the present disclosure, a method of operating an automated lane change system of a motor vehicle is provided. The motor vehicle includes a steering wheel, a propulsion mechanism, and a braking mechanism manually operable by a driver. The system includes a user interface, at least one environmental sensor, a steering wheel sensor, a controller, an actuator, and a notification device. The user interface generates a lane change request signal, in response to the user interface receiving an associated command from the driver. The environmental sensor generates an input signal indicative of at least: a position of an object relative to the motor vehicle, with the object being disposed at a distance from the motor vehicle; a velocity of the object relative to the motor vehicle; and a road geometry including at least a radius of curvature. The steering wheel sensor generates a gripped signal, in response to the driver gripping the steering wheel. The controller generates an activation signal, in response to the controller receiving the lane change request signal from the user interface, the input signal from the environmental sensor, and the gripped signal from the steering wheel sensor. The actuator controls the steering wheel, the propulsion mechanism, and the braking mechanism for maneuvering the motor vehicle from a current driving lane to a target driving lane that is positioned adjacent to the current driving lane, at least in response to the actuator receiving the activation signal from the controller. The notification device indicates to the driver that the actuator is maneuvering the motor vehicle from the current driving lane to the target driving lane, in response to the notification device receiving the activation signal from the controller.

In one aspect, the driver overrides the actuator by manually operating at least one of the steering wheel, the propulsion mechanism, and the braking mechanism.

In another aspect, the controller generates an instruction signal, in response to the controller receiving the lane change request signal from the user interface and the controller not receiving the gripped signal from the steering wheel sensor. The notification device instructs the driver to grip the steering wheel, in response to the notification device receiving the instruction signal from the controller.

In another aspect, when the motor vehicle is not towing a trailer, the controller determines that a distance threshold is a predetermined empirical value in a reference lookup table, which is based on at least the velocity of the object relative to the motor vehicle and the length of only the motor vehicle. In addition, when the motor vehicle is towing the trailer, the controller also determines that the distance threshold is an updated empirical towing value in the reference lookup table, which is based on the combined length of the motor vehicle and the trailer and the velocity of the object relative to the motor vehicle.

In another aspect, the controller generates the activation signal, in response to the controller comparing the velocity of the object to a velocity threshold and determining that the velocity is below the velocity threshold. The controller generates the activation signal, in response to the controller comparing the distance between the motor vehicle and the object to a distance threshold and determining that the distance is above the distance threshold, controller generates the activation signal, in response to the controller calculating a lateral acceleration based on at least the radius of curvature, comparing the lateral acceleration to a lateral acceleration threshold, and determining that the lateral acceleration is below the lateral acceleration threshold.

In another aspect, the controller initiates a timer, in response to the controller receiving the lane change request signal from the user interface. The environmental sensor generates a location signal indicative of the motor vehicle positioned in the target driving lane. The controller generates a termination signal, in response to at least one of: the controller receiving the location signal from the environmental sensor; and the controller not receiving the gripped signal from the steering wheel sensor within a predetermined amount of time. The notification device indicates that the system is deactivated, in response to the notification device receiving the termination signal from the controller.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

An exemplary automated lane change system for a motor vehicle instructs a driver to grip a steering wheel so as to enable the system to automatically maneuver the vehicle for changing lanes. While an actuator controls the steering wheel to maneuver the motor vehicle from a current driving lane to a target driving lane, the driver can override the actuator and steer the motor vehicle in any direction during the maneuver. It is contemplated that the method and system can be enabled or overridden in response to the driver handling other portions of the vehicle.

Figure 1:
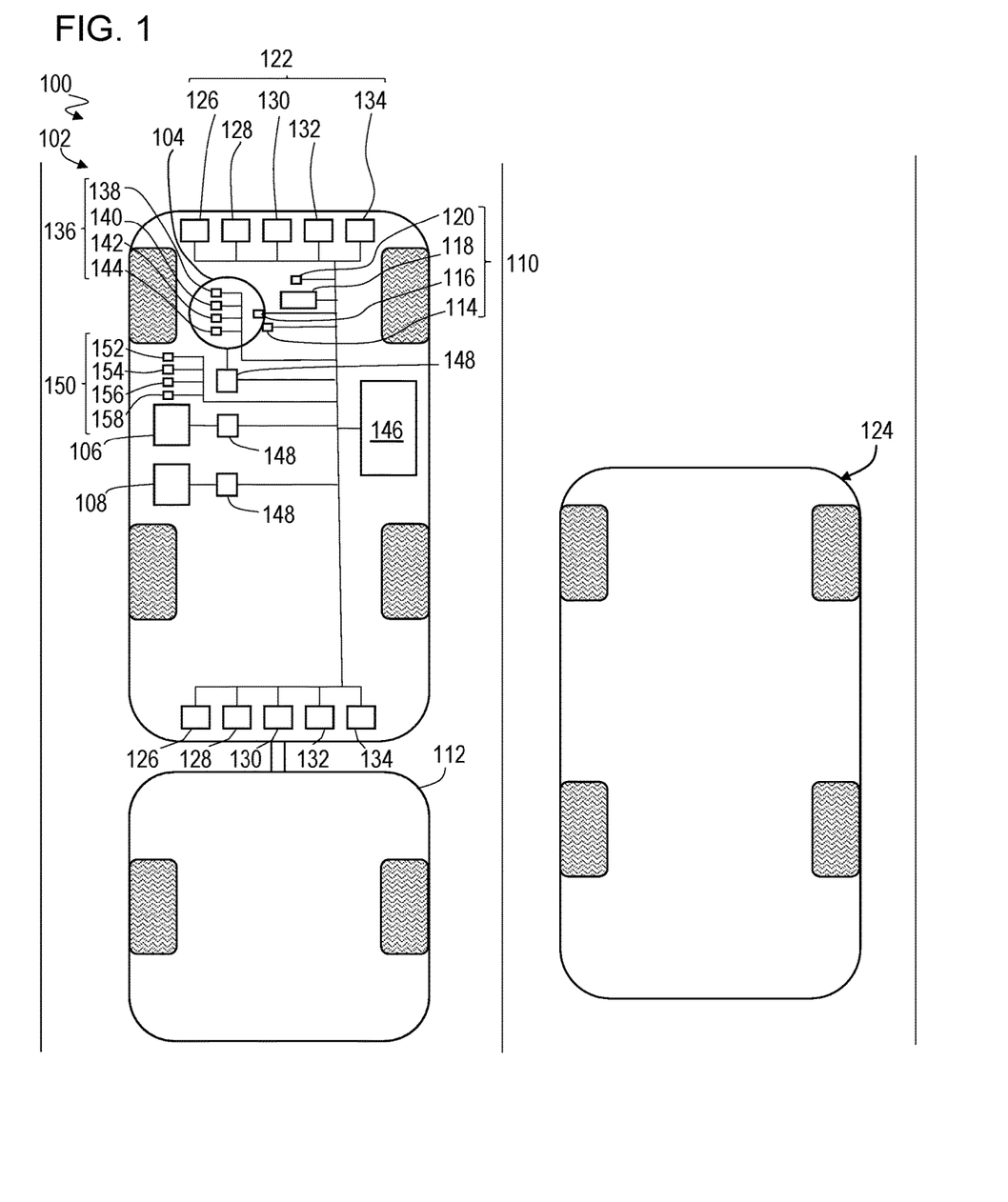
FIG. 1 is a schematic diagram of one example of a motor vehicle having an automated lane change system.

Referring to FIG. 1, one example of a motor vehicle 100 having an automated lane change system 102 ("system") for a motor vehicle is illustrated. The motor vehicle 100 includes multiple mechanisms for controlling the maneuverability of the motor vehicle 100. The motor vehicle 100 includes a steering wheel 104 adapted to be gripped by a driver for controlling a direction of the motor vehicle 100. The motor vehicle 100 further includes a propulsion mechanism 106 operated by the driver for propelling the motor vehicle 100. The motor vehicle 100 further includes a braking mechanism 108 for decreasing a speed of the motor vehicle 100.

The motor vehicle 100 further includes an automated lane change system 102 ("system") for receiving a command from a driver and operating one or more mechanisms that control the movement of the motor vehicle 100 from the current driving lane to the target driving lane. More specifically, the system 102 includes a user interface 110 positioned within the motor vehicle 100, and the user interface 110 generates a lane change request signal, in response to the user interface 110 receiving an associated command from the driver. In one example, the command by the driver can include data, such as the length, the width, the height, the weight, or other suitable parameter of a trailer 112 being towed by the motor vehicle 100. However, it is contemplated that the data can be provided or inputted by other devices including the environmental sensors as described in detail below.

The user interface 110 can be a turning signal stalk 114 that generates the lane change request signal, in response to the driver moving the turning signal stalk 114 in a direction associated with the motor vehicle 100 turning left or a direction associated with the motor vehicle 100 turning right. Another non-limiting example of the user interface 110 can be a switch 116 mounted to the steering wheel 104 and generating the lane change request signal, in response to the driver operating the switch 116. Still another non-limiting example of the user interface 110 can be a touch screen display 118, a microphone 120, or other suitable devices that generate the lane change request signal, in response to the driver operating the device to enter an associated command. It is contemplated that the system can include any suitable user interface generating the lane change request signal in response to a command from the driver.

The system 102 further includes one or more environmental sensors 122 adapted to be mounted to the motor vehicle 100 in a rear facing direction, forward facing direction, a side facing direction, or any combination thereof. The environmental sensors 122 generate an input signal indicative of a position of an object 124 relative to the motor vehicle 100, with the object 124 being disposed external to the motor vehicle 100. For instance, the input signal may indicate that an object is disposed within the target driving lane and at a distance of fifty feet rearward from the motor vehicle 100. Non-limiting examples of the objects include other motor vehicles, bicycles, pedestrians, road construction, or large road debris. The input signal can be further indicative of a velocity of the object relative to the motor vehicle 100. In another example, the input signals can be indicative of trailer data, such as the length, the width, the height, the weight, or other suitable parameter of a trailer 112 being towed by the motor vehicle 100. In yet another example, the input signal can be indicative of road geometry, such radius of curvature or lane width, and road conditions, such as icy road conditions. The environmental sensors 122 can further generate a location signal indicative of the motor vehicle 100 being positioned in the target driving lane.

Non-limiting examples of the environmental sensors can include a long range radar sensor 126, a short range radar sensor 128, a lidar sensor 130, a camera 132, an ultrasonic sensor 134, other suitable sensors, or any combination thereof. It is contemplated that the input signal can also be received from other vehicles or infrastructure under a V2X environment.

The system 102 further includes a steering wheel sensor 136 mounted to the motor vehicle 100. The steering wheel sensor 136 generates a gripped signal, in response to the driver gripping the steering wheel 104. Non-limiting examples of the steering wheel sensor 136 can include a capacitance sensor 138, a resistive sensor 140, an electrostatic sensor 142, a camera 144, other suitable sensors or combinations of the same that are configured to detect the driver placing his hands on the steering wheel. It is contemplated that the system can include only one of these steering wheel sensors. However, in other examples, the system can include a combination of these sensors.

The system 102 further includes a controller 146 communicating with the user interface, the environmental sensors 122, and the steering wheel sensor 136. As described in more detail associated with the notification device, the controller 146 generates an instruction signal and initiates a timer, in response to the controller 146 receiving the lane change request signal from the user interface 110. The controller 146 further generates an activation signal, in response to the controller 146 receiving the gripped signal from the steering wheel sensor 136 and the input signal from the environmental sensors 122.

More specifically, in this example, the controller 146 can generate the activation signal, in response to the controller 146 comparing data associated with the input signal to corresponding threshold values. Continuing with the previous example, the controller 146 can generate the activation signal in response to the controller 146 comparing the velocity of the object 124 to a velocity threshold and determining that the velocity is below the velocity threshold. The controller 146 can generate the activation signal in response to the controller 146 comparing the distance between the motor vehicle 100 and the object 124 to a distance threshold and determining that the distance is above the distance threshold. The controller 146 can generate the activation signal, in response to the controller 146 calculating lateral acceleration based on the radius of curvature, comparing the lateral acceleration to a lateral acceleration threshold, and determining that the lateral acceleration is below the lateral acceleration threshold. In other examples, the controller does not calculate lateral acceleration of the upcoming road or current road, but instead compares real-time lateral acceleration that has been measured by an accelerometer. It is contemplated that the controller can generate the activation signal, in response to the controller comparing other attributes of the objects, the road itself, or combinations of the same to the associated threshold values.

In this example, the distance threshold is a predetermined empirical value in a reference lookup table, which is based on at least the velocity of the object 124 relative to the motor vehicle 100 and the length of only the motor vehicle 100, when the motor vehicle 100 is not towing a trailer 112. In addition, the user interface 110 the environmental sensors 122, or combination of the same can be configured to input the length of the trailer 112 being towed by the motor vehicle 100. The controller 146 can determine that an updated distance threshold is a predetermined empirical value in the reference lookup table, which is based on the combined length of the motor vehicle 100 and the trailer 112 and the velocity of the object 124 relative to the motor vehicle 100. The controller 146 further generates a termination signal, in response to the controller 146 receiving the location signal from the environmental sensor 122 or the controller 146 not receiving the gripped signal from the steering wheel sensor 136 within a predetermined amount of time after the timer has been initiated.

In one example, the controller can be an External Object Computing Module ("EOCM") which processes the input signals from all the environmental sensors. The EOCM executes Sensor Fusion algorithms which provide increased fidelity of the final object dynamic attributes, including position, velocity, object type and other suitable parameters. Once the fused objects are created, they are then fed into Threat Assessment algorithm, which determines if those objects pose threat to the motor vehicle 100 based on their position and relative velocity as well as a planned path of the motor vehicle 100.

The system further includes one or more actuators 148 communicating with the controller 146 and coupled to an associated one of the steering wheel 104, the propulsion mechanism 106, and the braking mechanism 108. The actuators 148 control an associated one of the steering wheel 104, the propulsion mechanism 106, and the braking mechanism 108, in response to the actuators 148 receiving the activation signal from the controller 146. More specifically, in this example, one actuator 148 controls the steering wheel 104 for maneuvering the motor vehicle 100 from the current driving lane to the target driving lane, at least in response to the actuator 148 receiving the activation signal from the controller 146. The actuator 148 is configured to be overridden by the driver manually operating at the steering wheel 104, the propulsion mechanism 106, the braking mechanism 108, or any combination thereof.

The system 102 further includes a notification device 150 for instructing the driver to grip the steering wheel, in response to the notification device 150 receiving the instruction signal from the controller 146. The notification device 150 further indicates to the driver that one or more actuators 148 are maneuvering the motor vehicle 100 from the current driving lane to the target driving lane, in response to the notification device 150 receiving the activation signal from the controller 146. The notification device 150 further indicates that the system 102 is deactivated, in response to the notification device 150 receiving the termination signal from the controller 146. As one non-limiting example, the notification device 150 can be a display screen XX configured to display text or a symbol associated with the instruction to grip the steering wheel, in response to the display screen 152 receiving the instruction signal from the controller 146. As another non-limiting example, the notification device 150 can be a an indicator lamp 154 mounted to the steering wheel 104 or an instrument cluster of the motor vehicle 100, and the indicator lamp 154 can be configured to emit a predetermined color associated with the instruction, in response to the indicator lamp 154 receiving the instruction signal from the controller 146. Another non-limiting example of the notification device 150 can include a speaker 156 configured to emit an audible instruction for the driver to grip the steering wheel 104, in response to the speaker 156 receiving the instruction signal from the controller 146. In still another non-limiting example, the notification device 150 can be a vibration device 158 mounted to a vehicle seat positioned within the motor vehicle 100 and configured to vibrate, in response to the vibration device 158 receiving the instruction signal from the controller 146.

Figure 2:
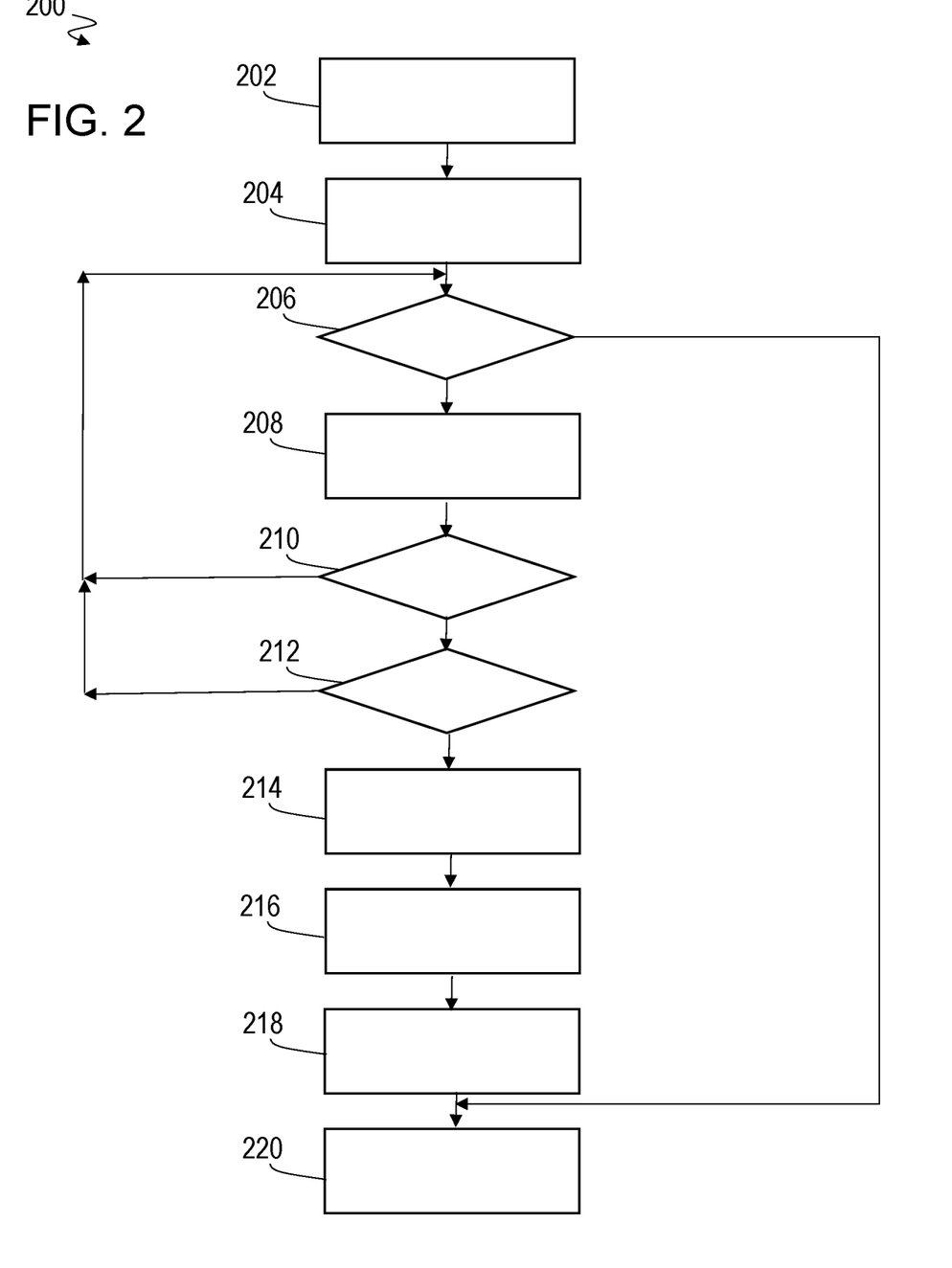
FIG. 2 is flow chart of one example of a method of operating the automated lane change system of FIG. 1.

Referring to FIG. 2, a flow chart of one example of a method 200 of operating the system of FIG. 1 is illustrated. The method 200 commences at block 202 with the user interface 110 generating a lane change request signal, in response to the user interface receiving an associated command from the driver. In one example where the motor vehicle 100 is towing a trailer, the command can include data on the trailer, including the length, the width, the height, the weight, and other suitable characteristics of the trailer. In one non-limiting example, this step can be accomplished by the driver moving the turning signal stalk 114 in a direction associated with the motor vehicle turning left or a direction associated with the motor vehicle turning right, which in turn causes the turning stalk to generate associated lane change request signals. In another non-limiting example, this step can be accomplished by the driver operating the switch 116 mounted to the steering wheel, which in turn causes the switch to generate the associated lane change request signal. In still another non-limiting example, the driver can enter an associated command to operate the touch screen display 118, the microphone 120, or other suitable devices, which in turn generates the lane change request signal.

At block 204, the controller 146 initiates a timer and generates an instruction signal, in response to the controller 146 receiving the lane change request signal from the user interface 110. The notification device 150 instructs the driver to grip the steering wheel 104, in response to the notification device receiving the instruction signal from the controller 146.

At block 206, the controller 146 compares an amount of elapsed time to a predetermined amount of time. If the amount of elapsed time is less than the predetermined amount of time, the method proceeds to block 208. If the amount of elapsed time is equal to or more than the predetermined amount of time, the method proceeds to block 220.

At block 208, the environmental sensors 122 generate an input signal indicative of at least the distance between the motor vehicle 100 and an object 124 disposed external to the motor vehicle 100. In addition, the environmental sensors 122 generate an input signal further indicative of the velocity of the object relative to the motor vehicle 100.

At block 210, the controller 146 determines whether the driver is positioned to override the system 102. In this example, if the controller 146 determines that the controller 146 has received the gripped signal from the steering wheel sensor 136, the method proceeds to block 212. If the controller 146 determines that the controller 146 has not received the gripped signal, the method returns to 206.

At block 212, the controller 146 determines whether the autonomous maneuver is feasible. Continuing with the previous example, this step can be accomplished by the controller 146 comparing the measured parameters of the object with the thresholds. More specifically, the controller 146 compares the velocity of the object to the velocity threshold, the distance between the motor vehicle and the object to the distance threshold and the lateral acceleration to the lateral acceleration threshold. It is contemplated that the controller can comparing any other attribute of the objects, the road itself, or any combination of the same to threshold values.

More specifically, the controller 146 determines data associated with the motor vehicle 100 and any trailer 112 towed by the motor vehicle 100, in response to the controller 146 receiving the lane change request from the user interface 110. This data can be the length, the width, the height, or the weight of the vehicle or the combined vehicle and trailer when the vehicle is towing a trailer. Furthermore, the controller 146 can access reference lookup tables to determine threshold values associated with the data. For instance, when the controller 146 determines that the motor vehicle 100 is not towing a trailer, the controller can in turn determine that a distance threshold is a predetermined empirical value in a reference lookup table, based on at least the velocity of the object relative to the motor vehicle and the length of only the motor vehicle. When the controller 146 determines that the motor vehicle 100 is towing the trailer, the controller 146 can in turn determine that an updated distance threshold is an predetermined empirical value in the reference lookup table, based on the combined length of the motor vehicle and the trailer and the velocity of the object relative to the motor vehicle.

If the controller 146 determines that the velocity is below the velocity threshold, the distance is above the distance threshold, and the lateral acceleration is below the lateral acceleration threshold, the method proceeds to block 214. If the controller 146 determines that the velocity is above the velocity threshold, the distance is below the distance threshold, or the lateral acceleration is above the lateral acceleration threshold, the method returns to block 206.

At block 214, the controller 146 generates the activation signal, in response to the controller 146 the data associated with the lane change request not exceeding the associated threshold values.

At block 216, the actuators 148 control at least one of the steering wheel 104, the propulsion mechanism 106, and the braking mechanism 108 for maneuvering the motor vehicle 100 from the current driving lane to the target driving lane, at least in response to the actuator 148 receiving the activation signal from the controller 146. In addition, the notification device 150 indicates to the driver that the actuator 148 is maneuvering the motor vehicle 100 from the current driving lane to the target driving lane. During this maneuver, the driver with his hands on the steering wheel 104 can override the actuator 148 by manually operating the steering wheel 104, as well as the propulsion mechanism 106 and the braking mechanism 108, when for example, the driver chooses a path that is different from the currently planned path of the motor vehicle 100.

At block 218, the environmental sensors 122 generate a location signal indicative of the motor vehicle 100 being positioned in the target driving lane.

At block 220, the controller generates a termination signal, in response to at least one of: the controller receiving the location signal from the environmental sensor 122; and the controller 146 not receiving the gripped signal from the steering wheel sensor 136 within the predetermined amount of time. The notification device 150 indicates that the system is deactivated and/or steering control has been ceded to the driver, in response to the notification device 150 receiving the termination signal from the controller 146.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. An automated lane change system for a motor vehicle having a steering wheel adapted to be gripped by a driver, the system comprising:
    at least one environmental sensor adapted to be mounted to the motor vehicle and generating an input signal indicative of at least one of:
        a position of an object relative to the motor vehicle, with the object being disposed at a distance from the motor vehicle;
        a velocity of the object relative to the motor vehicle; and
        a road geometry including at least a radius of curvature;
    a steering wheel sensor adapted to be mounted to the motor vehicle and generating a gripped signal in response to the driver gripping the steering wheel;
    a controller communicating with the at least one environmental sensor and the steering wheel sensor, and the controller generating an activation signal in response to the controller receiving the input signal from the at least one environmental sensor and the gripped signal from the steering wheel sensor;
    at least one actuator communicating with the controller and coupled to at least one of the steering wheel, a propulsion mechanism, and a braking mechanism of the motor vehicle, with the at least one actuator controlling at least one of the steering wheel, the propulsion mechanism, and the braking mechanism for maneuvering the motor vehicle from a current driving lane to a target driving lane that is positioned adjacent to the current driving lane, at least in response to the actuator receiving the activation signal from the controller; and
    a notification device for indicating to the driver that the at least one actuator is maneuvering the motor vehicle from the current driving lane to the target driving lane in response to the notification device receiving the activation signal from the controller.

2. The system of claim 1, wherein the at least one actuator is configured to be overridden by the driver manually operating at least one of the steering wheel, the propulsion mechanism, and the braking mechanism.

3. The system of claim 2 further comprising a user interface communicating with the controller and generating a lane change request signal in response to the user interface receiving an associated command from the driver, with the controller generating the activation signal in further response to the controller receiving the lane change request signal from the user interface.

4. The system of claim 3 wherein the user interface comprises at least one of a turning signal stalk, a switch mounted to the steering wheel, a touch screen display, and a microphone communicating with the controller and positioned within the motor vehicle.

5. The system of claim 3, wherein the steering wheel sensor comprises at least one of a capacitance sensor attached to the steering wheel, a resistive sensor attached to the steering wheel, an electrostatic sensor attached to the steering wheel, and a camera; and
wherein the at least one environmental sensor comprises at least one of a lidar, a short range radar, a long range radar, an ultrasonic sensor, and a camera.

6. The system of claim 3, wherein the controller is configured to generate the activation signal, in further response to at least one of:
the controller comparing the velocity of the object to a velocity threshold and determining that the velocity is below the velocity threshold;
the controller comparing the distance between the motor vehicle and the object to a distance threshold and determining that the distance is above the distance threshold; and
the controller calculating a lateral acceleration based on at least the radius of curvature, comparing the lateral acceleration to a lateral acceleration threshold, and determining that the lateral acceleration is below the lateral acceleration threshold.

7. A motor vehicle comprising:
a steering wheel adapted to be gripped by a driver and for controlling a direction of the motor vehicle;
a propulsion mechanism operated by the driver for propelling the motor vehicle;
a braking mechanism for decreasing a speed of the motor vehicle; and
an automated lane change system comprising:
a user interface positioned within the motor vehicle and generating a lane change request signal in response to the user interface receiving an associated command from the driver;
at least one environmental sensor mounted to the motor vehicle and generating an input signal indicative of at least one of:
a position of an object relative to the motor vehicle, with the object being disposed at a distance from the motor vehicle;
a velocity of the object relative to the motor vehicle; and
a road geometry including at least a radius of curvature;
a steering wheel sensor mounted to the motor vehicle and generating a gripped signal in response to the driver gripping the steering wheel;
a controller communicating with the at least one environmental sensor and the steering wheel sensor, with the controller generating an activation signal in response to the controller receiving the input signal from the at least one environmental sensor and the gripped signal from the steering wheel sensor;
at least one actuator communicating with the controller and coupled to at least one of the steering wheel, the propulsion mechanism, and the braking mechanism, with the at least one actuator controlling at least one of the steering wheel, the propulsion mechanism, and the braking mechanism for maneuvering the motor vehicle from a current driving lane to a target driving lane that is positioned adjacent to the current driving lane, at least in response to the actuator receiving the activation signal from the controller; and
a notification device for indicating to the driver that the at least one actuator is maneuvering the motor vehicle from the current driving lane to the target driving lane in response to the notification device receiving the activation signal from the controller.

8. The system of claim 7 wherein the controller generates an instruction signal in response to the controller receiving the lane change request signal from the user interface and the controller not receiving the gripped signal from the steering wheel sensor, and wherein the notification device instructs the driver to grip the steering wheel in response to the notification device receiving the instruction signal from the controller.

9. The system of claim 8, wherein the notification device comprises at least one of:
a display screen configured to display text or a symbol associated with the instruction to grip the steering wheel in response to the display screen receiving the instruction signal from the controller;
an indicator lamp mounted to at least one of the steering wheel and an instrument cluster of the motor vehicle and configured to emit a predetermined color associated with the instruction in response to the indicator lamp receiving the instruction signal from the controller;
a speaker configured to emit an audible instruction in response to the speaker receiving the instruction signal from the controller; and
a vibration device mounted to a motor vehicle seat positioned within the motor vehicle and configured to vibrate in response to the vibration device receiving the instruction signal from the controller.

10. The system of claim 8 wherein the at least one actuator is configured to be overridden by the driver manually operating the steering wheel.

11. The system of claim 10 wherein the distance threshold is a predetermined empirical value in a reference lookup table based on at least the velocity of the object relative to the motor vehicle and the length of only the motor vehicle when the motor vehicle is not towing a trailer.

12. The system of claim 11 wherein at least one of the user interface and the environmental sensors are configured to input the length of a trailer being towed by the motor vehicle, and the controller determines an updated distance threshold as an empirical value in the reference lookup table based on the velocity of the object relative to the motor vehicle and the combined length of the motor vehicle and the trailer.

13. The system of claim 11 wherein the at least one environmental sensor generates a location signal indicative of the motor vehicle positioned in the target driving lane, the controller generates a termination signal in response to the controller receiving the location signal from the at least one environmental sensor, and the notification device indicates that the system is deactivated in response to the notification device receiving the termination signal from the controller.

14. The system of claim 12 wherein the controller initiates a timer in response to the controller receiving the lane change request signal from the user interface, and the controller generates the termination signal in further response to the controller not receiving the gripped signal within a predetermined amount of time from the controller initiating the timer.

15. A method of operating an automated lane change system of a motor vehicle, the motor vehicle having a steering wheel, a propulsion mechanism, and a braking mechanism manually operable by a driver, and the automated lane change system having a user interface, at least one environmental sensor, a steering wheel sensor, a controller, an actuator, and a notification device, the method comprising:

generating, using the user interface, a lane change request signal in response to the user interface receiving an associated command from the driver;

generating, using the at least one environmental sensor, an input signal indicative of at least one of:
　a position of an object relative to the motor vehicle, with the object being disposed at a distance from the motor vehicle;
　a velocity of the object relative to the motor vehicle; and
　a road geometry including at least a radius of curvature;

generating, using the steering wheel sensor, a gripped signal in response to the driver gripping the steering wheel;

generating, using the controller, an activation signal in response to the controller receiving the lane change request signal from the user interface, the input signal from the at least one environmental sensor, and the gripped signal from the steering wheel sensor;

controlling, using the at least one actuator, at least one of the steering wheel, the propulsion mechanism, and the braking mechanism for maneuvering the motor vehicle from a current driving lane to a target driving lane that is positioned adjacent to the current driving lane, at least in response to the actuator receiving the activation signal from the controller; and indicating, using the notification device, to the driver that the at least one actuator is maneuvering the motor vehicle from the current driving lane to the target driving lane in response to the notification device receiving the activation signal from the controller.

16. The method of claim 15 wherein the driver overrides the actuator by manually operating at least one of the steering wheel, the propulsion mechanism, and the braking mechanism.

17. The method of claim 16 further comprising generating, using the controller, an instruction signal in response to the controller receiving the lane change request signal from the user interface and the controller not receiving the gripped signal from the steering wheel sensor, and the notification device instructs the driver to grip the steering wheel in response to the notification device receiving the instruction signal from the controller.

18. The method of claim 17 further comprising:
determining, with the controller, when the motor vehicle is not towing a trailer, that a distance threshold is a predetermined empirical value in a reference lookup table based on at least the velocity of the object relative to the motor vehicle and the length of only the motor vehicle; and
determining, with the controller, when the motor vehicle is towing the trailer, that the distance threshold is an updated empirical towing value in the reference lookup table based on the combined length of the motor vehicle and the trailer and the velocity of the object relative to the motor vehicle.

19. The method of claim 18 further comprising generating, using the controller, the activation signal in response to at least one of:
the controller comparing the velocity of the object to a velocity threshold and determining that the velocity is below the velocity threshold;
the controller comparing the distance between the motor vehicle and the object to a distance threshold and determining that the distance is above the distance threshold; and
the controller calculating a lateral acceleration based on at least the radius of curvature, comparing the lateral acceleration to a lateral acceleration threshold, and determining that the lateral acceleration is below the lateral acceleration threshold.

20. The method of claim 19 further comprising:
initiating, using the controller, a timer in response to the controller receiving the lane change request signal from the user interface;
generating, using the at least one environmental sensor, a location signal indicative of the motor vehicle positioned in the target driving lane;
generating, using the controller, a termination signal in response to at least one of:
　the controller receiving the location signal from the at least one environmental sensor; and
　the controller not receiving the gripped signal from the steering wheel sensor within a predetermined amount of time; and
indicating, using the notification device, that the system is deactivated in response to the notification device receiving the termination signal from the controller.

* * * * *